(12) United States Patent
Zheng et al.

(10) Patent No.: US 12,340,454 B2
(45) Date of Patent: Jun. 24, 2025

(54) METHOD AND APPARATUS FOR DISPLAYING LYRIC EFFECTS, ELECTRONIC DEVICE, AND COMPUTER READABLE MEDIUM

(71) Applicant: BEIJING BYTEDANCE NETWORK TECHNOLOGY CO., LTD., Beijing (CN)

(72) Inventors: Niwen Zheng, Beijing (CN); Lei Sun, Beijing (CN); Tao Li, Beijing (CN); Sen Zhao, Beijing (CN); Jia Qu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/601,261

(22) PCT Filed: Jul. 15, 2021

(86) PCT No.: PCT/CN2021/106572
§ 371 (c)(1),
(2) Date: Oct. 4, 2021

(87) PCT Pub. No.: WO2022/105272
PCT Pub. Date: May 27, 2022

(65) Prior Publication Data
US 2022/0351454 A1    Nov. 3, 2022

(30) Foreign Application Priority Data
Nov. 18, 2020    (CN) .......................... 202011295410.5

(51) Int. Cl.
*G06T 13/80*    (2011.01)
*G06F 3/0482*    (2013.01)
(Continued)

(52) U.S. Cl.
CPC .............. *G06T 13/80* (2013.01); *G06F 16/64* (2019.01); *G06F 16/685* (2019.01);
(Continued)

(58) Field of Classification Search
None
See application file for complete search history.

(56) References Cited

U.S. PATENT DOCUMENTS 7,876,325 B1 * 1/2011 Sharma ................... G06T 11/60
345/589
2006/0262142 A1 * 11/2006 Nam ................. H04M 1/72427
345/636
(Continued)

FOREIGN PATENT DOCUMENTS

| CN | 103686450 A | 3/2014 |
|---|---|---|
| CN | 104811829 A | 7/2015 |

(Continued)

OTHER PUBLICATIONS

International Patent Application No. PCT/CN2021/106572, International Search Report mailed Sep. 28, 2021, 4 pages.
(Continued)

*Primary Examiner* — Jeffrey J Chow

(57) ABSTRACT

The present disclosure provides a method and an apparatus for displaying lyric effects, an electronic device, and a computer-readable medium. The method includes: obtaining, based on a lyric effect display operation of a user, an image sequence and music data to be displayed, the music data including audio data and lyrics; determining a target time point, playing at least one target image corresponding to the target time point in the image sequence, and determining target lyrics corresponding to the target time point in the lyrics; and adding animation effects on the at least one target image, displaying the target lyrics on the at least one target image (Continued)

target image, and playing a part of the audio data corresponding to the target lyrics.

11 Claims, 6 Drawing Sheets

(51) Int. Cl.
*G06F 16/64* (2019.01)
*G06F 16/683* (2019.01)
*G06T 11/20* (2006.01)
*G06T 11/60* (2006.01)

(52) U.S. Cl.
CPC ............ *G06T 11/203* (2013.01); *G06T 11/60* (2013.01); *G06F 3/0482* (2013.01); *G06T 2200/24* (2013.01)

(56) References Cited

U.S. PATENT DOCUMENTS

| | | | | |
|---|---|---|---|---|
| 2009/0089651 | A1* | 4/2009 | Herberger | G06F 16/40 715/202 |
| 2012/0323559 | A1* | 12/2012 | Ikeda | G10H 1/0008 704/9 |
| 2013/0125000 | A1* | 5/2013 | Fleischhauer | H04N 21/2743 715/723 |
| 2015/0071605 | A1* | 3/2015 | Ogawa | H04N 5/775 386/241 |
| 2016/0133295 | A1* | 5/2016 | Boyle | G11B 27/031 386/240 |
| 2017/0332020 | A1 | 11/2017 | Ouyang et al. | |
| 2017/0352379 | A1* | 12/2017 | Oh | G11B 27/11 |
| 2018/0047374 | A1* | 2/2018 | Numata | G06F 3/16 |
| 2018/0075879 | A1* | 3/2018 | Prasad | G11B 27/036 |
| 2018/0374461 | A1* | 12/2018 | Serletic | H04N 9/8211 |
| 2019/0132642 | A1* | 5/2019 | Wang | H04N 21/8549 |
| 2020/0351450 | A1 | 11/2020 | Kim et al. | |

FOREIGN PATENT DOCUMENTS

| | | |
|---|---|---|
| CN | 104867511 A | 8/2015 |
| CN | 104967801 A | 10/2015 |
| CN | 106128440 A | 11/2016 |
| CN | 106910491 A | 6/2017 |
| CN | 107027050 A | 8/2017 |
| CN | 107943964 A | 4/2018 |
| CN | 107944397 A | 4/2018 |
| CN | 108334540 A | 7/2018 |
| CN | 109034063 A | 12/2018 |
| CN | 110213504 A | 9/2019 |
| CN | 110647703 A | 1/2020 |
| CN | 112380379 A | 2/2021 |
| TW | 201640888 A | 11/2016 |

OTHER PUBLICATIONS

First Office Action issued Oct. 9, 2022 in Chinese Application No. 202011295410.5, with English translation (16 pages).
Second Office Action issued Jan. 19, 2023 in Chinese Application No. CN202011295410.5, with English translation (21 pages).
Grant Notice issued Apr. 7, 2023 in Chinese Application No. CN202011295410.5, with English translation (3 pages).
Examination Report issued Nov. 21, 2023 in Indian Application No. 202127044635, with English translation (7 pages).
Office Action issued Sep. 8, 2023 in Indonesian Application No. P00202108300, with English translation (4 pages).
Written Opinion for International Application No. PCT/CN2021/106572, mailed Sep. 28, 2021, 9 Pages.

* cited by examiner

METHOD AND APPARATUS FOR DISPLAYING LYRIC EFFECTS, ELECTRONIC DEVICE, AND COMPUTER READABLE MEDIUM

The present application is a U.S. 371 Application of International Patent Application No. PCT/CN2021/106572, filed on 15 Jul. 2021, which application claims priority to the Chinese Patent Application No. 202011295410.5, titled "METHOD AND APPARATUS FOR DISPLAYING LYRIC EFFECTS, ELECTRONIC DEVICE, AND COMPUTER-READABLE MEDIUM" filed with the China National Intellectual Property Administration on Nov. 18, 2020, the entire contents of which are incorporated herein by reference in their entireties.

FIELD

The present disclosure relates to the technical field of video processing, and in particular, to a method for displaying lyric effects, an apparatus for displaying lyric effects, an electronic device, and a computer-readable medium.

BACKGROUND

With the development of video technology, people's requirements for music videos are getting higher and higher. The appearance of music lyrics in music videos is already a very common feature.

In the existing music videos, the lyrics will scroll or translate at the bottom of the video when the music is being played. Some technologies will also have the function of coloring the lyrics, but these are simply superimposing the lyrics with the video. The entry and exit of the lyrics are some basic effects, resulting in a poor user experience.

SUMMARY

Technical Problems

The purpose of the present disclosure is to at least solve one of the above-mentioned technical defects, especially the technical problems of a simple superposition of lyrics and videos in the related art, the entry and exit of lyrics being some basic effects, and poor user experience.

Technical Solutions

In a first aspect, a method for displaying lyric effects is provided, the method including: obtaining, based on a lyric effect display operation of a user, an image sequence and music data to be displayed, the music data including audio data and lyrics; determining a target time point, playing at least one target image corresponding to the target time point in the image sequence, and determining target lyrics corresponding to the target time point in the lyrics; and adding animation effects on the at least one target image, displaying the target lyrics on the at least one target image, and playing a part of the audio data corresponding to the target lyrics.

In a second aspect, an apparatus for displaying lyric effects is provided, the apparatus including: a data obtaining module, configured to obtain, based on a lyric effect display operation of a user, an image sequence and music data to be displayed, the music data including audio data and lyrics; a lyric determination module, configured to determine a target time point, play at least one target image corresponding to the target time point in the image sequence, and determine target lyrics corresponding to the target time point in the lyrics; and a special effects display module, configured to add animation effects on the at least one target image, display the target lyrics on the at least one target image, and play a part of the audio data corresponding to the target lyrics.

In a third aspect, an electronic device is provided, the electronic device including: one or more processors; a memory; and one or more application programs stored in the memory and configured to be executed by the one or more processors to execute the above method for displaying lyric effects.

In a fourth aspect, a computer-readable medium is provided. The readable medium has at least one instruction, at least one program segment, a set of codes, or a set of instructions stored thereon, and the at least one instruction, the at least one program segment, the set of codes, or the set of instructions is loaded and executed by a processor to implement the above method for displaying lyric effects.

Beneficial Effects

In the embodiments of the present disclosure, by obtaining the lyrics, special effects, and at least one target image corresponding to the target time point, and superimposing the lyrics and special effects on the at least one target image for display, and playing the corresponding music at the same time, the lyrics appear with special effects when the user listens to the music, thereby providing better user experience.

BRIEF DESCRIPTION OF DRAWINGS

In order to more clearly illustrate the technical solutions in the embodiments of the present disclosure, the drawings that need to be used in the description of the embodiments of the present disclosure will be briefly introduced below.

Figure 1:
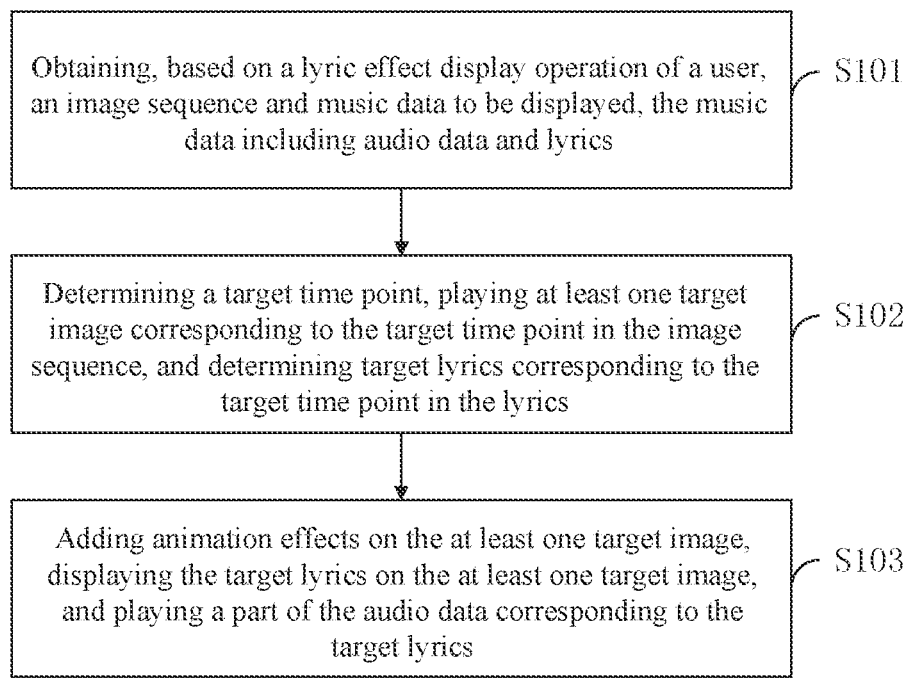
FIG. 1 is a flowchart of a method for displaying lyric effects provided by an embodiment of the present disclosure.

The above and other features, advantages, and aspects of the embodiments of the present disclosure will become more apparent with reference to the accompanying drawings and the following specific implementations. Throughout the accompanying drawings, same or similar elements are denoted by same or similar reference numerals. It should be understood that the drawings are illustrative and the components and elements are not necessarily drawn to scale.

DESCRIPTION OF EMBODIMENTS

Hereinafter, embodiments of the present disclosure will be described in more detail with reference to the accompanying drawings. Although some embodiments of the present disclosure are illustrated in the drawings, it should be understood that the present disclosure can be implemented in various forms and should not be construed as being limited to the embodiments set forth herein. On the contrary, these embodiments are provided for a more thorough and complete understanding of this disclosure. It should be understood that the drawings and embodiments of the present disclosure are only used for exemplary purposes, and are not used to limit the protection scope of the present disclosure.

It should be understood that the various steps recorded in the method implementations of the present disclosure may be executed in a different order, and/or executed in parallel. In addition, method implementations may include additional steps and/or omit to perform the illustrated steps. The scope of the present disclosure is not limited in this respect.

The term "including" and its variants as used herein are open-ended including, that is, "including but not limited to"; the term "based on" is "at least in part based on"; the term "one embodiment" means "at least one embodiment"; the term "another embodiment" means "at least one additional embodiment"; the term "some embodiments" means "at least some embodiments." Related definitions of other terms will be given ire the following description.

It should be noted that the concepts of "first" and "second" mentioned in the present disclosure are only used to distinguish apparatuses, modules or units, and are not used to limit these apparatuses, modules or units to be different apparatuses, modules or units, and are not used to limit the order or interdependence of the functions performed by these apparatuses, modules or units.

It should be noted that the modification with "a" or "a plurality of" mentioned in the present disclosure is illustrative and not restrictive. Those skilled in the art should understand that unless the context clearly indicates otherwise, it should be understood as "a or a plurality of".

The names of messages or information exchanged between a plurality of apparatuses in the implements of the present disclosure are only used for illustrative purposes, and are not used to limit the scope of these messages or information.

The method, apparatus electronic device, and computer-readable medium for displaying lyric effects provided by the present disclosure are intended to solve the above technical problems in the related art.

The technical solutions of the present disclosure and how the technical solutions of the present disclosure solve the above technical problems will be described in detail below with specific embodiments. The following specific embodiments can be combined with each other, and the same or similar concepts or processes may not be repeated in some embodiments. The embodiments of the present disclosure will be described below in conjunction with the accompanying drawings.

An embodiment of the present disclosure provides a method for displaying lyric effects, which is applied to a user terminal and can be a function of an APP (application) in the user terminal, such as a video APP, or a functional plug-in in an APP, such as a functional plug-in in a small video player program. The application terminal is configured with an image data display apparatus and an audio data player apparatus. As shown in FIG. 1, the method includes, step S101, obtaining, based on a lyric effect display operation of a user, an image sequence and music data to be displayed, the music data including audio data and lyrics; step S102, determining a target time point, playing at least one target image corresponding to the target time point in the image sequence, and determining target lyrics corresponding to the target time point in the lyrics; and step S103, adding animation effects on the at least one target image, displaying the target lyrics on the at least one target image, and playing a part of the audio data corresponding to the target lyrics.

In the embodiments of the present disclosure, the image sequence refers to image data that needs to be displayed in a display background, and is image data having a sequence frame, such as video data. The music data includes audio data and lyrics. The lyrics may be Chinese lyrics or lyrics in other languages.

In the embodiment of the present disclosure, the target time point is a relative time point, which is a time point relative to a play start point of the music data when the music data is played, and is also a time point relative to a play start point of the image sequence when the image sequence is played.

In the embodiment of the present disclosure, the image sequence and music data to be displayed are obtained based on the lyric effect display operation of the user. The image sequence and music data may be data stored locally, or data downloaded from the Internet, or data recorded by the user. The target time point is obtained, and the target time point may be a play time point of the image data or music data, or a certain time point in the image data or music data selected by the user for the user to preview the lyric effects at that time point. The lyrics corresponding to the target time point in the music data and the animation effects corresponding to the target time point are obtained based on the target time point. The animation effects may be pre-configured, e.g., selecting animation effects from a preset animation effect library, or may be manually added by the user. At least one target image corresponding to the target time point in the image sequence is determined. For example, the number of the at least one target image can be determined based on the frame number of the animation effects. For example, the lyrics and the animation effects are sequentially superimposed on the at least one target image for display, and the music data is played.

Figure 2:
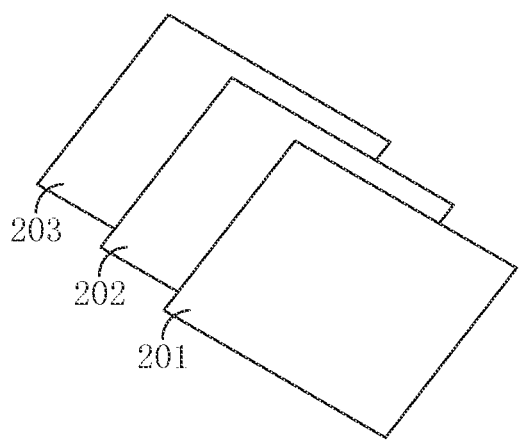
FIG. 2 is a schematic diagram of a three-layer structure provided by an embodiment of the disclosure.

For the embodiments of the present disclosure, for convenience of description, a specific embodiment is taken as an example. The obtained image sequence and music data to be processed are a video and a song, respectively. Optionally, the video and the song are two files. In the embodiment of the present disclosure, the target time point can be a time point specified by the user, or a time point when animation effects need to be added during the playing of the video and the music. The time point can be preset or selected by the user, optionally, the target time point is a time point when the animation effects is added as designated by the user, e.g., at the beginning of the first sentence of lyrics of the music play. Based on the target time point, the corresponding target lyrics, e.g., the first sentence of lyrics of the music, is obtained, the corresponding animation effects are obtained, optionally, the animation effects are pre-configured animation effects, and the corresponding at least one target image in the video is obtained, optionally, the at least one target image is 5 frames of images after the target time point. For example, as shown in FIG. 2, the finally displayed content is divided into three layers. The lyrics can be used as a first display layer 201, the animation effects can be used as a second display layer 202, and the first display layer and the second display layer are superimposed on the target image 203 for display. Optionally, the lyrics can be added in a form of a lyric patch to the image. The special effects can be a special effects image or a special effects shot. Optionally, the superimposition method is to paste the lyrics and the animation effects onto the target image by superimposing frames. Then the target image is displayed and the corresponding music is played at the same time.

In the embodiments of the present disclosure, by obtaining the corresponding lyrics, the special effects, and the at least one target image based on the target time point, and superimposing the lyrics and the special effects on the at least one target image for display, and playing the corresponding music at the same time, the lyrics appear with special effects accompanied when the user listens to the music, thereby providing better user experience.

Figure 3:
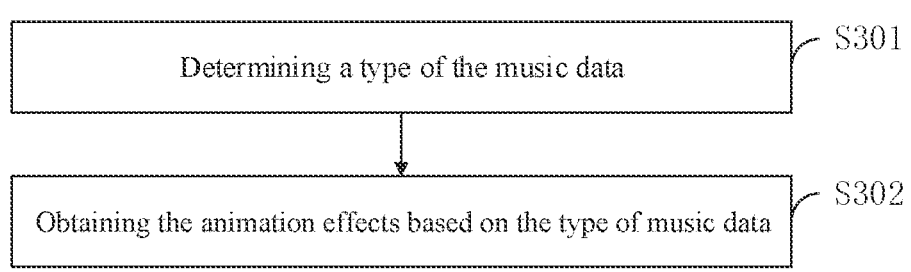
FIG. 3 is a flowchart of a method for obtaining animation effects provided by an embodiment of the present disclosure.

The embodiment of the present disclosure provides a possible implementation manner. As shown in FIG. 3, said obtaining the animation effects corresponding to the target time point includes: step S301, determining a type of the music data, and step S302, obtaining the animation effects based on the type of music data.

In the embodiments of the present disclosure, the type of the music data is used to indicate the style of music, such as a love song, rock, etc. Optionally, the type of the music data. can be classified according to an existing classification rule. The pre-configured animation effects may be different for different types of music.

For the embodiments of the present disclosure, for the convenience of description, a specific embodiment is taken as an example. If the type of the music data obtained is a love song, animation effects such as small love hearts may be correspondingly pre-configured. If the type of the music data is a festive song, animation effects such as firecrackers may be correspondingly configured; optionally, if not satisfied with the pre-configured animation effects, the user may choose to add special effects manually, optionally, the user may conduct an action of adding special effects, or the user selects special effects that he/she wants to add, or the user uploads special effects that he/she wants to add, etc.

In the embodiment of the present disclosure, by adding special effects based on the type of the music data, a higher degree of matching between the special effects and the music is achieved, and the user experience is better.

In some embodiments, said obtaining the animation effects corresponding to the target time point includes: obtaining the animation effects based on a content of the target lyrics.

In the embodiment of the present disclosure, the configuration of the animation effects may be associated to the content of the target lyrics, and different target lyrics may match different animation effects.

For the embodiments of the present disclosure, for convenience of description, a specific embodiment is taken as an example. When the content of the target lyrics is "It's raining", the corresponding animation effects may be configured as a raining dark cloud. When the content is "The sun is in the sky", the corresponding special effects may be configured as animation effects of appearing of a sun. Optionally, if not satisfied with the pre-configured animation effects, the user may choose to add special effects manually, optionally, the user may conduct an action of adding special effects, or the user selects special effects that he/she wants to add, or the user uploads special effects that he/she wants to add, etc.

The embodiment of the present disclosure matches the corresponding animation effects with the content of the target lyrics. Therefore, the effects are more matched with the music, and the user experience is better.

Figure 4:
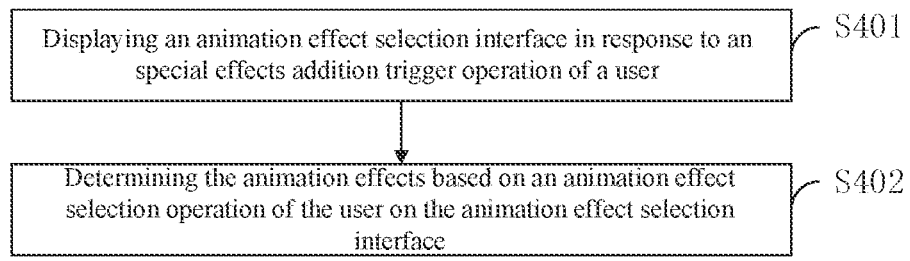
FIG. 4 is a flowchart of a method for selecting animation effects provided by an embodiment of the present disclosure.

In some embodiments, as shown in FIG. 4, the method further includes: step S401, displaying an animation effect selection interface in response to an special effects addition trigger operation of a user; and step S402, determining the animation effects based on an animation effect selection operation of the user on the animation effect selection interface.

In the embodiment of the present disclosure, when the user is not satisfied with the pre-configured animation effects, he/she may choose to manually add the desired animation effects.

Figure 5:
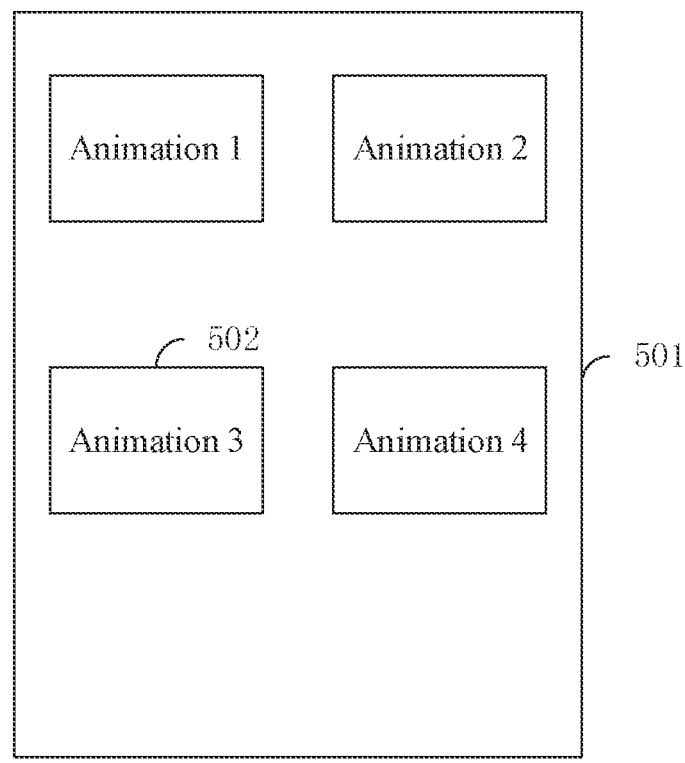
FIG. 5 is a schematic diagram of an animation selection interface provided by an embodiment of the disclosure.

For the embodiments of the present disclosure, for convenience of description, a specific embodiment is taken as an example. As shown in FIG. 5, the animation effect selection trigger operation of the user is received, and the animation effect selection interface is displayed. A plurality of optional animation effects 502 is displayed in the animation effect selection interface 501. One or more of the plurality of animation effects may be selected and added to the target image corresponding to the target time point based on the user's operation. Optionally, displaying the optional animations may be displaying thumbnails or names of the animations, or the like. The user may click the thumbnail or name to add a complete animation. After the user confirms the selection in the interface, the selected effects are the effects to be added. If the user is not satisfied after viewing the complete animation, he/she can return to the selection interface to select again.

In the embodiments of the present disclosure, the user can select the animation effects that he/she wants to add. The selectivity of special effects is strong, and the user experience is better.

Figure 6:
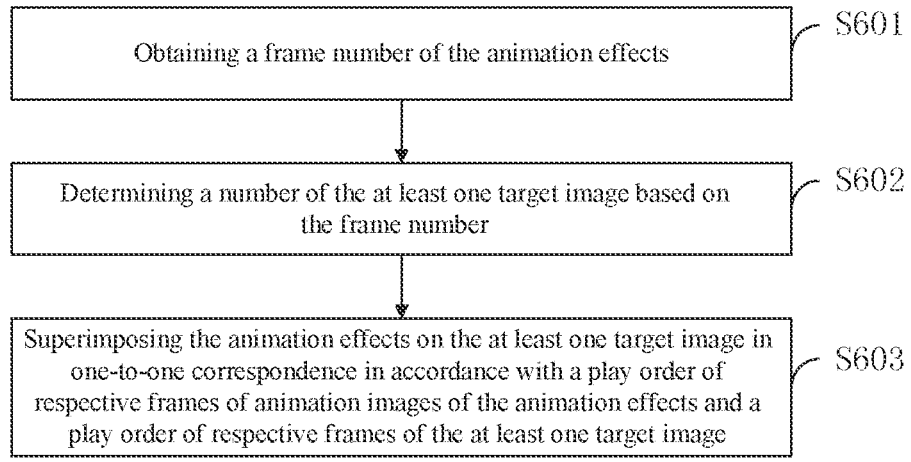
FIG. 6 is a flowchart of a method for obtaining at least one target image provided by an embodiment of the disclosure.

In some embodiments, as shown in FIG. 6, the animation effects include a plurality of frames of animation images. Determining the at least one target image corresponding to the target time point in the image sequence includes: step S601, obtaining a frame number of the animation effects; step S602, determining a number of the at least one target image based on the frame number; and step S603, superimposing the animation effects on the at least one target image in one-to-one correspondence in accordance with a play order of respective frames of animation images of the animation effects and a play order of respective frames of the at least one target image.

In the embodiment of the present disclosure, the animation effects are displayed in the form of a sequence frame. One animation effect may include a plurality of sequence frames, and the plurality of sequence frames corresponds to a plurality of target images.

In some embodiments, said determining the number of the at least one target image based on the frame number includes: determining the at least one target image corresponding to the target time point in the image sequence based on the target time point and the frame number of the animation effects. The number of the at least one target image is equal to the frame number of the animation effects.

In some embodiments, said determining the at least one target image corresponding to the target time point in the image sequence based on the target time point and the frame number of the animation effects includes: determining at least one adjacent image corresponding to the frame number after the target time point as the at least one target image; or determining one frame image at the target time point, a first number of images before the target time point, and a second number of images after the target time point as the at least one target image; or determining a third number of images before the target time point and a fourth number of images after the target time point as the at least one target image.

For the embodiments of the present disclosure, for convenience of description, a specific embodiment is taken as an example. For animation effects that need to be added, the frame number of the animation effects is obtained. For example, for the special effects "raining dark cloud", 5 sequence frames are included, each sequence frame includes a dark cloud, and the difference in the position of the raindrops in each sequence frame gives the experience of the special effects of raining. Optionally, corresponding to the special effects of 5 sequence frame, that the target time point corresponds to 5 frames of target images in the image sequence is determined. Optionally, the 5 frames of target images are images near the target time point. Optionally, the 5 frames of target images are 5 frames of images after the target time point. Optionally, the 5 frames of target images may be composed of one frame of image at the target time point, two frames of images before the target time point, and two frames of images after the target time point.

The embodiment of the present disclosure determines the frame number of the at least one target image based on the frame number of the animation effects, so as to ensure that the animation effect frames can be pasted to the target image in one-to-one correspondence.

For example, the number of the at least one target image is equal to the frame number of the animation effects, and the animation effects can serve as the second display layer. Said superimposing the second display layer on respective images in the at least one target image includes: superimposing the animation effects on the at least one target image in one-to-one correspondence in accordance with a play order of respective frames of animation images of the animation effects and a play order of respective frames of the at least one target image.

Figure 7:
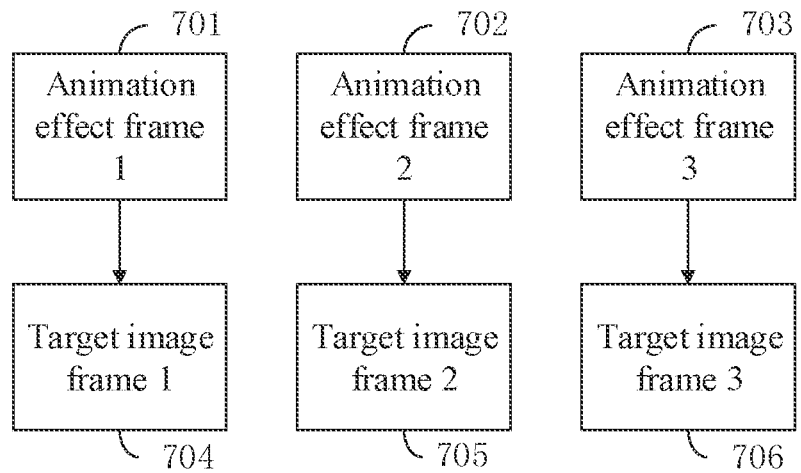
FIG. 7 is a schematic diagram of superimposition of special effects provided by an embodiment of the present disclosure.

For the embodiments of the present disclosure, for convenience of description, a specific embodiment is taken as an example. As shown in FIG. 7, the animation effects include 3 frames of images, including animation effect frames 701 to 703, corresponding to 3 target image frames 704 706. Optionally, combining the animation effects with the target images includes superimposing the animation effect frame 701 on the target image frame 704, superimposing the animation effect frame 702 on the target image frame 705, and superimposing the animation effect frame 703 on the target image frame 706. The processed image frames are finally displayed. The positions of the animation effect frames on the target image frames may be preset, or determined according to the animation effects.

In the embodiments of the present disclosure, the animation effect frames and the target image frames are combined in one-to-one correspondence, the processed target image frames are finally displayed, and the effects are also displayed accordingly.

Figure 8:
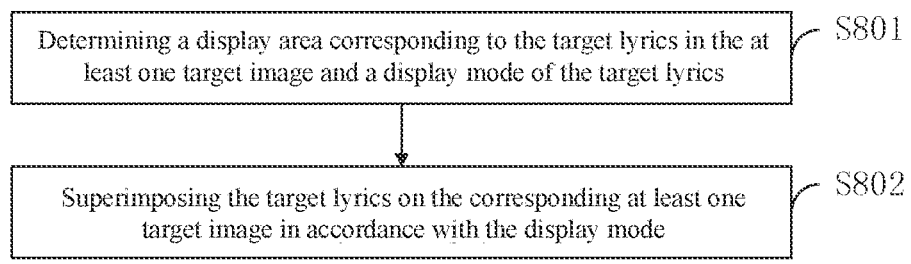
FIG. 8 is a flowchart of a method for displaying lyrics provided by an embodiment of the present disclosure.

In some embodiments, as shown in FIG. 8, said displaying the target lyrics on the at least one target image includes: step S801, determining a display area corresponding to the target lyrics in the at least one target image and a display mode of the target lyrics; and step S802, superimposing the target lyrics on the corresponding at least one target image in accordance with the display mode.

In the embodiment of the present disclosure, superimposing the target lyrics on the at least one target image may include selecting to superimpose the target lyrics on different areas in the at least one target image, and may also include selecting the display mode of the target lyrics.

For example, the target lyrics can be used as the first display layer. Accordingly, said displaying the target lyrics on the at least one target image is superimposing the first display layer on each image of the at least one target image.

In some embodiments, said determining the display mode of the target lyrics includes: determining the display mode of the target lyrics in accordance with a size of the display area.

In some embodiments, the display mode of the target lyrics includes at least one of: a number of words of lyrics displayed on each line in the display area, an alignment mode of the lyrics displayed on each line in the display area, or a font and a font size of the lyrics.

Figure 9:
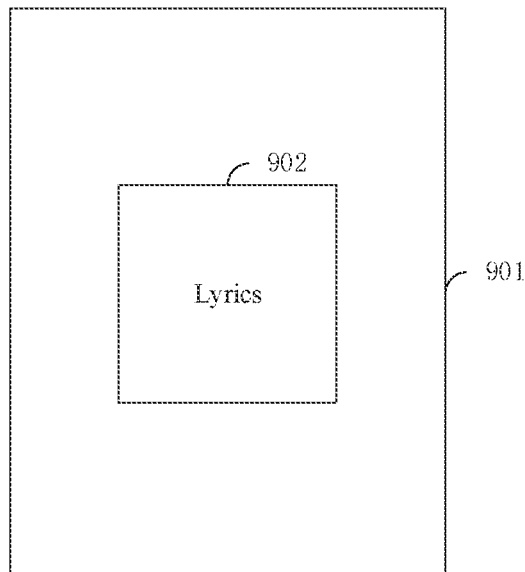
FIG. 9 is a schematic diagram of a display area of lyrics provided by an embodiment of the present disclosure.
Figure 10:
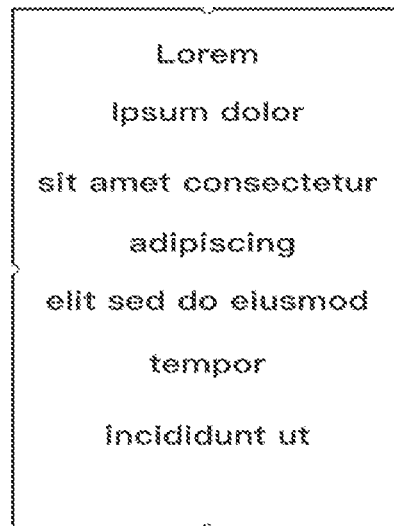
FIG. 10 is a schematic diagram of composition of lyrics provided by an embodiment of the present disclosure.
Figure 11:
FIG. 11 is a schematic diagram of alignment of lyrics provided by an embodiment of the present disclosure.

For the embodiments of the present disclosure, for convenience of description, a specific embodiment is taken as an example. The display area of the target lyrics in the at least one target image is determined. Optionally, as shown in FIG. 9, an area 902 for displaying lyrics in the target image 901 is a middle area of the target image 901. Optionally, the display mode of the target lyrics can be determined based on the size of the display area. Optionally, as shown in FIG. 10, a display width of the display area is determined, the number of words of lyrics displayed on each line in the area is determined, and lyrics of each line are enlarged to be aligned with both ends. As shown in FIG. 11, enlarging the lyrics may include adjusting the font of the lyrics, and superimposing the adjusted lyrics on the corresponding display area in the target image. The lyrics in the embodiment of the present disclosure are all English lyrics as an example. Optionally, the lyrics may be Chinese lyrics or lyrics in other languages.

According to the embodiment of the present disclosure, by adjusting the display mode of the lyrics, and displaying the lyrics in the display area of the target image, the display of the lyrics is flexible, which gives users a strong visual impact.

In some embodiments, said determining the target time point includes: receiving a time point selection operation of the user; and determining the target time point based on the time point selection operation.

In the embodiment of the present disclosure, the determination of the target time point may be determined based on the operation of the user. Optionally, an time adjustment axis may be displayed on the display interface, and the user may select the target time point by adjusting the time adjustment axis.

In the embodiment of the present disclosure, the user can select the target time point. The user may preview special effects at different time points, and may also choose to add special effects at different time points.

In some embodiments, the method further includes: synthesizing the processed image sequence and the music data into a video based on a video generation operation of the user.

In the embodiment of the present disclosure, the processed image sequence and the music data are synthesized into a music video based on the video generation operation of the user. The video generation operation of the user may be a touch operation of the user based on the display interface, or an operation of the user when selecting the image sequence and the music data to be processed. The user can select to generate a video when selecting the image sequence and the music data to be processed. After the processing of the image sequence is completed, the video will be automatically generated.

In the embodiment of the present disclosure, the user can select to generate a video, which is convenient for the user to perform operations such as sharing the video.

According to the embodiment of the present disclosure, based on the target time point, the corresponding lyrics, special effects, and at least one target image are obtained, and the lyrics and the special effects are superimposed on the at least one target image for display, and the corresponding music is played at the same time. When the user listens to the music, the lyrics appears with special effects, thereby providing better user experience.

Figure 12:
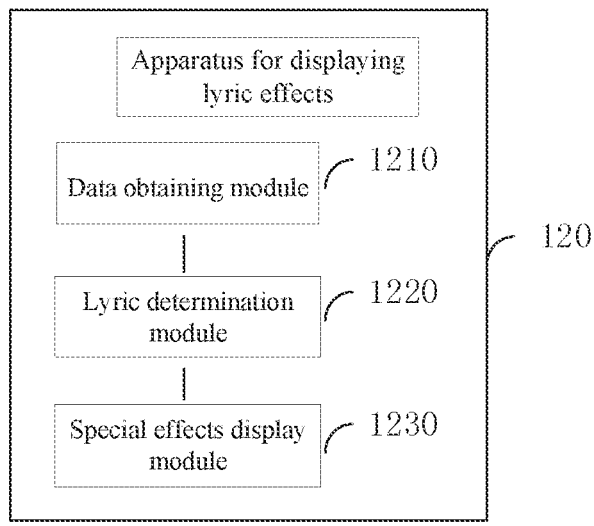
FIG. 12 is a structural schematic diagram of an apparatus for displaying lyric effects provided by an embodiment of the present disclosure.

The embodiment of the present disclosure provides an apparatus for displaying lyric effects. As shown in FIG. 12, the apparatus for displaying lyric effects 120 may include: a data obtaining module 1210, a lyric determination module 1220, and an special effects display module 1230.

The data obtaining module 1210 is configured to obtain, based on a lyric effect display operation of a user, an image sequence and music data to be displayed, the music data including audio data and lyrics.

The lyric determination module 1220 is configured to determine a target time point, play at least one target image corresponding to the target time point in the image sequence, and determine target lyrics corresponding to the target time point in the lyrics.

The special effects display module 1230 is configured to add animation effects on the at least one target image, display the target lyrics on the at least one target image, and play a part of the audio data corresponding to the target lyrics.

In some embodiments, the special effects display module 1230 may be configured to, before adding the animation effects on the at least one target image, determine a type of the music data and obtain the animation effects based on the type of the music data.

In some embodiments, the special effects display module 1230 may be configured to obtain the animation effects based on a content of the target lyrics before adding the animation effects on the at least one target image.

In some embodiments, the special effects display module 1230 may be configured to, before adding the animation effects on the at least one target image, display an animation effect selection interface in response to a special effects addition trigger operation of a user and determine the animation effects based on an animation effect selection operation of the user on the animation effect selection interface.

In some embodiments, the animation effects include a plurality of frames of animation images. The special effects display module 1230 may be configured to, when adding the animation effects on the target images, obtain a frame number of the animation effects, determine a number of the at least one target image based on the frame number of the animation effects, and superimpose the animation effects on the at least one target image in one-to-one correspondence in accordance with a play order of respective frames of animation images of the animation effects and a play order of frames of the at least one target image.

In some embodiments, the special effects display module 1230 can be configured to, when determining the number of the at least one target image based on the frame number, determine the at least one target image corresponding to the target time point in the image sequence based on the target time point and the frame number of the animation effects. The number of the at least one target image is equal to the frame number of the animation effects.

In some embodiments, the special effects display module 1230 can be configured to, when determining the at least one target image corresponding to the target time point in the image sequence based on the target time point and the frame number of the animation effects, determine adjacent images corresponding to the frame number after the target time point as the at least one target image; or determine one frame image at the target time point, a first number of images before the target time point, and a second number of images after the target time point as the at least one target image: or determine a third number of images before the target time point and a fourth number of images after the target time point as the at least one target image.

In some embodiments, the special effects display module 1230 can be configured to, when displaying the target lyrics on the at least one target image, determine a display area corresponding to the target lyrics in the at least one target image and a display mode of the target lyrics; and superimpose the target lyrics on the corresponding at least one target image in accordance with the display mode.

In some embodiments, the special effects display module 1230 can be configured to, when determining the display mode of the target lyrics, determine the display mode of the target lyrics based on a size of the display area.

In some embodiments, the display mode of the target lyrics includes at least one of: a number of words of lyrics displayed on each line in the display area, an alignment mode of the lyrics displayed on each line in the display area, or a font and a font size of the lyrics, In some embodiments, the lyric determination module 1220 can be configured to, when determining the target time point, receive a time point selection operation of the user; and determine the target time point based on the time point selection operation.

In some embodiments, the special effects display module 1230 can be further configured to synthesize the image sequence, the animation effects, and the music data into a video based on a video generation operation of the user.

Optionally, the lyric effect display apparatus according to the embodiment of the present disclosure can execute the lyric effect display method shown in the foregoing embodiment of the present disclosure, and the implementation principle is similar, and will not be repeated here.

Figure 13:
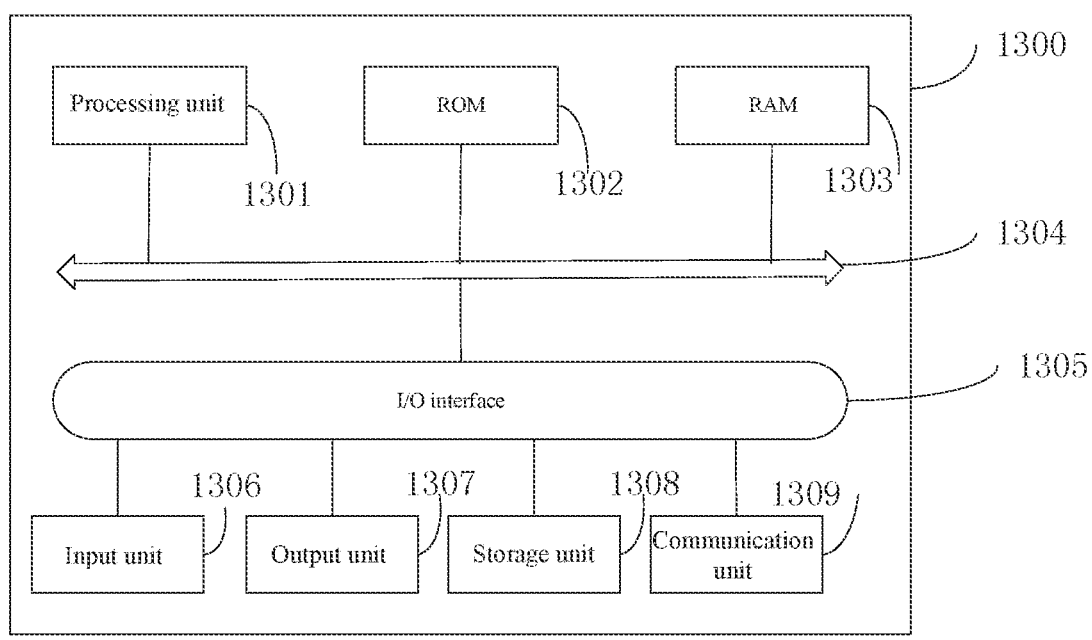
FIG. 13 is a structural schematic diagram of an electronic device provided by an embodiment of the disclosure.

Reference is now made to FIG. 13, which is a structural schematic diagram of an electronic device 1300 adapted to implement the embodiments of the present disclosure. The terminal devices according to the embodiments of the present disclosure may include, but are not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 13 is exemplary only, and should not be construed as limiting the function and scope of use of the embodiments of the present disclosure.

The electronic device includes a memory and a processor, wherein the processor here may be referred to as the processing unit 1301 below, and the memory may include at least one of a read-only memory (ROM) 1302, a random access memory (RAM) 1303, and a storage unit 1308 below, as illustrated in detail below:

As illustrated in FIG. 13, the electronic device 1300 may include a processing unit (such as a central processing unit, a graphics processing unit, etc.) 1301, which may perform various appropriate actions and processes in accordance with programs stored in a Read Only Memory (ROM) 1302 or loaded from a storage apparatus 1308 into a Random Access Memory (RAM) 1303. In the RAM 1303, various programs and data required for the operation of the electronic device 1300 may also be stored. The processing unit 1301, the ROM 1302, and the RAM 1303 are connected to each other through a bus 1304. An input/output (I/O) interface 1305 is also connected to the bus 1304.

Generally, the following apparatuses may be connected to the I/O interface 1305: an input unit 1306 including, for example, a touch screen, a touch pad, a keyboard, a mouse, a camera, a microphone, an accelerometer, a gyroscope, etc.; an output unit 1307 including, for example, a Liquid Crystal Display (LCD), a speaker, an oscillator, etc.; a storage unit 1308 including, for example, a magnetic tape or a hard disk, etc.; and a communication unit 1309. The communication unit 1309 may allow the electronic device 1300 to perform wireless or wired communication with other devices for data exchange. Although FIG. 13 illustrates the electronic device 1300 having various units, it can be appreciated that it is not necessary to implement or provide all the illustrated units. Alternatively, more or fewer units may be implemented or provided.

In particular, according to the embodiment of the present disclosure, the processes described above with reference to the flowcharts may be implemented as computer software programs. For example, an embodiment of the present disclosure includes a computer program product, which includes a computer program carried on a non-transitory computer readable medium. The computer program includes program codes for implementing the method illustrated in any of the flowcharts. In these embodiments, the computer program may be downloaded and installed from a network through the communication unit 1309, or installed from the storage unit 1308, or installed from the ROM 1302. When the computer program is executed by the processing unit 1301, the above functions defined in the methods according to the embodiments of the present disclosure are performed.

It is to be noted that the above computer-readable medium in the present disclosure may be a computer-readable signal medium or a computer-readable medium or any combination thereof. The computer-readable medium may be, but not limited to an electrical, magnetic, optical, electromagnetic, infrared, or semiconductor system, apparatus, or device, or any combination thereof. More specific examples of the computer-readable medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof in the present disclosure, the computer-readable medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may also be any computer-readable medium other than the computer-readable medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), etc., or any suitable combination thereof.

In some embodiments, the client and server can communicate with any currently known or future-developed network protocol such as HTTP (HyperText Transfer Protocol), and can be interconnected with any form or medium of digital data communication (for example, communication network). Examples of communication networks include local area networks ("LAN"), wide area networks ("WAN"), the Internet (for example, the Internet), and end-to-end networks (for example, ad hoc end-to-end networks), as well as any networks currently known or developed in the future.

The above computer-readable medium may be included in the above electronic device; or may be standalone without being assembled into the electronic device.

The above computer-readable medium carry one or more programs which, when executed by the electronic device, cause the electronic device to: obtain, based on a lyric effect display operation of a user, an image sequence and music data to be displayed, the music data including audio data and lyrics; determine a target time point, play at least one target image corresponding to the target time point in the image sequence, and determine target lyrics corresponding to the target time point in the lyrics; and add animation effects on the at least one target image, display the target lyrics on the at least one target image, and play a part of the audio data corresponding to the target lyrics.

The computer program code used to perform the operations of this disclosure can be written in one or more programming languages or a combination thereof. The above programming languages include but are not limited to object-oriented programming languages such as Java, Smalltalk, C++, and include conventional procedural programming languages such as "C" language or similar programming languages. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN) or it can be connected to an external computer (for example, using an Internet service provider to pass Internet connection).

The flowcharts and block diagrams in the drawings illustrate the possible implementation of the system architecture, functions, and operations of the system, method, and computer program product according to various embodiments of the present disclosure. In this regard, each block in the flowcharts or block diagrams may represent a module, a program segment, or a part of code, and the module, the program segment, or the part of code contains one or more executable instructions for implementing the specified logic function. It should also be noted that, in some alternative implementations, the functions marked in the block may also occur in a different order from the order marked in the drawings. For example, two blocks illustrated in succession can actually be executed substantially in parallel, and they can sometimes be executed in a reverse order, depending on the functions involved. It should also be noted that each block in the block diagrams and/or flowcharts, and the combination of the blocks in the block diagrams and/or flowcharts, can be implemented by a dedicated hardware-based system that performs the specified functions or operations or can be implemented by a combination of dedicated hardware and computer instructions.

The modules or units involved in the embodiments described in the present disclosure can be implemented in software or hardware.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASST), System on Chip (SOC), Complex Programmable Logic Device (CPLD), etc.

In the context of the present disclosure, a machine-readable medium may be a tangible medium including or storing programs, which may be used by or used with an instruction execution system, apparatus, or device. The machine-readable medium may be a machine-readable signal medium or a machine-readable storage medium. The machine-readable medium may be, but not limited to an electrical, magnetic, optical, electromagnetic, infrared, or semiconductor system, apparatus, or device, or any suitable combination thereof. More specific examples of the machine-readable storage media may include an electrical connection having one or more wires, a portable computer disk, a hard disk, a Random Access Memory (RAM), a Read Only Memory (ROM), an Erasable Programmable Read Only Memory (EPROM or a flash memory), an optical fiber, a Compact Disc Read-Only Memory (CD-ROM), an optical memory device, a magnetic memory device, or any suitable combination thereof.

According to one or more embodiments provided in the present disclosure, a method for displaying lyric effects is provided, and the method includes: obtaining, based on a lyric effect display operation of a user, an image sequence and music data to be displayed, the music data including audio data and lyrics; determining a target time point, playing at least one target image corresponding to the target time point in the image sequence, and determining target lyrics corresponding to the target time point in the lyrics; and adding animation effects on the at least one target image, displaying the target lyrics on the at least one target image, and playing a part of the audio data corresponding to the target lyrics.

In some embodiments, the method further includes, prior to said adding the animation effects on the at least one target image: determining a type of the music data; and obtaining the animation effects based on the type of the music data.

In some embodiments, the method further includes, prior to said adding the animation effects on the at least one target image: obtaining the animation effects based on a content of the target lyrics.

In some embodiments, the method further includes: displaying an animation effect selection interface in response to a special effects addition trigger operation of the user; and determining the animation effects based on an animation effect selection operation of the user on the animation effect selection interface.

In some embodiments, the animation effects include a plurality of frames of animation images, and said adding the animation effects on the at least one target image includes: obtaining a frame number of the animation effects; determining a number of the at least one target image based on the frame number; and superimposing the animation effects on the at least one target image in one-to-one correspondence in accordance with a play order of respective frames of animation images of the animation effects and a play order of respective frames of the at least one target image.

In some embodiments, said determining the number of the at least one target image based on the frame number includes: determining the at least one target image corresponding to the target time point in the image sequence based on the target time point and the frame number of the animation effects, where the number of the at least one target image is equal to the frame number of the animation effects.

In some embodiments, said determining the at least one target image corresponding to the target time point in the image sequence based on the target time point and the frame number of the animation effects includes: determining adjacent images corresponding to the frame number after the target time point as the at least one target image; or determining one image at the target time point, a first number of images before the target time point, and a second number of images after the target time point as the at least one target image; or determining a third number of images before the target time point and a fourth number of images after the target time point as the at least one target image.

In some embodiments, said displaying the target lyrics on the at least one target image includes: determining a display area corresponding to the target lyrics in the at least one target image and a display mode of the target lyrics; and superimposing the target lyrics on the corresponding at least one target image in accordance with the display mode.

In some embodiments, said determining the display mode of the target lyrics includes: determining the display mode of the target lyrics based on a size of the display area.

In some embodiments, the display mode of the target lyrics includes at least one of: a number of words of lyrics displayed on each line in the display area, an alignment mode of the lyrics displayed on each line in the display area, or a font and a font size of the lyrics, In some embodiments, said determining the target time point includes: receiving a time point selection operation of the user; and determining the target time point based on the time point selection operation.

In some embodiments, the method further includes: synthesizing the image sequence, the animation effects, and the music data into a video based on a video generation operation of the user.

According to one or more embodiments provided in the present disclosure, an apparatus for displaying lyric effects is provided, and the apparatus includes: a data obtaining module configured to obtain, based on a lyric effect display operation of a user, an image sequence and music data to be displayed, the music data comprising audio data and lyrics; a lyric determination module configured to determine a target time point, play at least one target image corresponding to the target time point in the image sequence, and determine target lyrics corresponding to the target time point in the lyrics; a special effects display module configured to add animation effects on the at least one target image, display the target lyrics on the at least one target image, and play a part of the audio data corresponding to the target lyrics.

In some embodiments, the special effects display module may be configured to, prior to adding the animation effects on the at least one target image, determine a type of the music data; and obtain the animation effects based on the type of the music data.

In some embodiments, the special effects display module may be configured to prior to adding the animation effects on the at least one target image, obtain the animation effects based on a content of the target lyrics.

In some embodiments, the special effects display module may be configured to, prior to adding the animation effects on the at least one target image, display an animation effect selection interface in response to a special effects addition trigger operation of the user; and determine the animation effects based on an animation effect selection operation of the user on the animation effect selection interface.

In some embodiments, the animation effects include a plurality of frames of animation images, and the special effects display module may be configured to, when adding the animation effects on the at least one target image: obtain a frame number of the animation effects; determine a number of the at least one target image based on the frame number; and superimpose the animation effects on the at least one target image in one-to-one correspondence in accordance with a play order of respective frames of animation images of the animation effects and a play order of respective frames of the at least one target image.

In some embodiments, the special effects display module may be configured to, when determining the number of the at least one target image based on the frame number, determine the art least one target image corresponding to the target time point in the image sequence based on the target time point and the frame number of the animation effects, where the number of the at least one target image is equal to the frame number of the animation effects.

In some embodiments, the special effects display module may be configured to, when determining the at least one target image corresponding to the target time point in the image sequence based on the target time point and the frame number of the animation effects, determine adjacent images corresponding to the frame number after the target time point as the at least one target image; or determine one frame image at the target time point, a first number of images before the target time point, and a second number of images after the target time point as the at least one target image; or determine a third number of images before the target time point and a fourth number of images after the target time point as the at least one target image.

In some embodiments, the special effects display module may be configured to, when displaying the target lyrics on the at least one target image, determine a display area corresponding to the target lyrics in the at least one target image and a display mode of the target lyrics; and superimpose the target lyrics on the corresponding at least one target image in accordance with the display mode.

In some embodiments, the special effects display module may be configured to, when determining the display mode of the target lyrics, determine the display mode of the target lyrics based on a size of the display area.

In some embodiment, the display mode of the target lyrics includes at least one of: a number of words of lyrics displayed on each line in the display area, an alignment mode of the lyrics displayed on each line in the display area, or a font and a font size of the lyrics.

In some embodiment, the lyric determination module may be configured to, when determining the target time point, receive a time point selection operation of the user and determine the target time point based on the time point selection operation.

In some embodiment, the special effects display module may be further configured to synthesize the image sequence, the animation effects, and the music data into a video based on a video generation operation of the user.

According to one or more embodiments provided in the present disclosure, an electronic device is provided, the electronic device including: one or more processors; a memory; and one or more application programs stored in the memory and configured to be executed by the one or more processors to execute the method for displaying lyric effects of the above embodiment.

According to one or more embodiments provided in the present disclosure, a computer-readable medium is provided, the readable medium has at least one instruction, at least one program segment, a set of codes, or a set of instructions stored thereon, and the at least one instruction, the at least one program segment, the set of codes, or the set of instructions is loaded and executed by a processor to implement the method for displaying lyric effects of the above embodiment.

The above description is only preferred embodiments of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by any combination of the above technical features or their equivalent features without departing from the above disclosed concept. For example, the above features and the technical features disclosed in the present disclosure (but not limited to) with similar functions are mutually replaced to form a technical solution.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the disclosure. Certain features that are described in the context of separate embodiments can also be implemented in combination in a single embodiment. Conversely, various features described in the context of a single embodiment can also be implemented in a plurality of embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for displaying lyric effects, applied in a user terminal, comprising:
obtaining, based on a lyric effect display operation of a user, an image sequence and music data to be displayed, the music data comprising audio data and lyrics;
determining a user-selected target time point, playing at least one target image corresponding to the user-selected target time point in the image sequence, and determining target lyrics corresponding to the user-selected target time point in the lyrics; and
adding, at the user terminal, an animation effect on the at least one target image, displaying the target lyrics on the at least one target image, and playing a part of the audio data corresponding to the target lyrics, wherein the animation effect comprises a plurality of frames of animation images, and said adding, at the user terminal, the animation effect on the at least one target image comprises:

determining a number of the plurality of frames included in the animation effect;

determining, from the image sequence, the at least one target image corresponding to the user-selected target time point and containing a number of image frames equal to the determined number of the plurality of frames included in the animation effect; and superimposing the plurality of frames of the animation effect on the determined at least one target image in one-to-one correspondence in accordance with a play order of respective frames of animation images of the animation effect and a play order of respective image frames of the determined at least one target image, wherein said determining, from the image sequence, the at least one target image corresponding to the user-selected target time point and containing a number of image frames equal to the determined number of the plurality of frames included in the animation effect comprises:

determining one image at the user-selected target time point, a first number of images before the user-selected target time point, and a second number of images after the user-selected target time point as the at least one target image, a sum of the first number and the second number being equal to the determined number of the plurality of frames included in the animation effect minus 1.

2. The method according to claim 1, further comprising, prior to said adding the animation effect on the at least one target image:

determining a type of the music data; and obtaining the animation effect based on the type of the music data.

3. The method according to claim 1, further comprising, prior to said adding the animation effect on the at least one target image:

obtaining the animation effect based on a content of the target lyrics.

4. The method according to claim 1, further comprising:

displaying an animation effect selection interface in response to a special effects addition trigger operation of the user; and determining the animation effect based on an animation effect selection operation of the user on the animation effect selection interface.

5. The method according to claim 1, wherein said displaying the target lyrics on the at least one target image comprises:

determining a display area corresponding to the target lyrics in the at least one target image and a display mode of the target lyrics; and superimposing the target lyrics on the corresponding at least one target image in accordance with the display mode.

6. The method according to claim 5, wherein said determining the display mode of the target lyrics comprises:

determining the display mode of the target lyrics based on a size of the display area.

7. The method according to claim 6, wherein the display mode of the target lyrics comprises at least one of: a number of words of lyrics displayed on each line in the display area, an alignment mode of the lyrics displayed on each line in the display area, or a font and a font size of the lyrics.

8. The method according to claim 1, wherein said determining the user-selected target time point comprises:

receiving a time point selection operation of the user; and determining the user-selected target time point based on the time point selection operation.

9. The method according to claim 1, further comprising:

synthesizing the image sequence, the animation effects, and the music data into a video based on a video generation operation of the user.

10. An electronic device being a user terminal, comprising:

one or more processors;

a memory; and one or more application programs stored in the memory and configured to be executed by the one or more processors, the one or more applications are configured to implement a method for displaying lyric effects, applied in the user terminal, comprising:

obtaining, based on a lyric effect display operation of a user, an image sequence and music data to be displayed, the music data comprising audio data and lyrics;

determining a user-selected target time point, playing at least one target image corresponding to the user-selected target time point in the image sequence, and determining target lyrics corresponding to the user-selected target time point in the lyrics; and adding, at the user terminal, an animation effect on the at least one target image, displaying the target lyrics on the at least one target image, and playing a part of the audio data corresponding to the target lyrics, wherein the animation effect comprises a plurality of frames of animation images, and said adding, at the user terminal, the animation effects on the at least one target image comprises:

determining a number of the plurality of frames included in the animation effect;

determining, from the image sequence, a number of the at least one target image corresponding to the user-selected target time point and containing a number of image frames equal to the determined number of the plurality of frames included in the animation effect; and superimposing the plurality of frames of the animation effect on the determined at least one target image in one-to-one correspondence in accordance with a play order of respective frames of animation images of the animation effect and a play order of respective image frames of the determined at least one target image, wherein said determining, from the image sequence, the at least one target image corresponding to the user-selected target time point and containing a number of image frames equal to the determined number of the plurality of frames included in the animation effect comprises:

determining one image at the user-selected target time point, a first number of images before the user-selected target time point, and a second number of images after the user-selected target time point as the at least one target image, a sum of the first number and the second number being equal to the determined number of the plurality of frames included in the animation effect minus 1.

11. A non-transitory computer-readable medium having at least one instruction, at least one program segment, a set of codes, or a set of instructions stored thereon, wherein the at least one instruction, the at least one program segment, the set of codes, or the set of instructions is loaded and executed by a processor to implement a method for displaying lyric effects, applied in a user terminal, comprising:

obtaining, based on a lyric effect display operation of a user, an image sequence and music data to be displayed, the music data comprising audio data and lyrics;

determining a user-selected target time point, playing at least one target image corresponding to the user-selected target time point in the image sequence, and determining target lyrics corresponding to the user-selected target time point in the lyrics; and adding, at the user terminal, an animation effect on the at least one target image, displaying the target lyrics on the at least one target image, and playing a part of the audio data corresponding to the target lyrics, wherein the animation effect comprises a plurality of frames of animation images, and said adding the animation effect on the at least one target image comprises:

determining a number of the plurality of frames included in the animation effect;

determining, from the image sequence, the at least one target image corresponding to the user-selected target time point and containing a number of image frames equal to the determined number of the plurality of frames included in the animation effect; and superimposing the plurality of frames of the animation effect on the determined at least one target image in one-to-one correspondence in accordance with a play order of respective frames of animation images of the animation effect and a play order of respective image frames of the determined at least one target image, wherein said determining, from the image sequence, the at least one target image corresponding to the user-selected target time point and containing a number of image frames equal to the determined number of the plurality of frames included in the animation effect comprises:

determining one image at the user-selected target time point, a first number of images before the user-selected target time point, and a second number of images after the user-selected target time point as the at least one target image, a sum of the first number and the second number being equal to the determined number of the plurality of frames included in the animation effect minus 1.

* * * * *